United States Patent
Ripa

(10) Patent No.: US 10,047,816 B2
(45) Date of Patent: Aug. 14, 2018

(54) DAMPING STRUT WITH A HYDRAULIC SHOCK ABSORBER AND METHOD FOR OPERATING THE DAMPING STRUT

(71) Applicant: Thomas Ripa, Herrsching (DE)

(72) Inventor: Thomas Ripa, Herrsching (DE)

( * ) Notice: Subject to any disclaimer, the term of this patent is extended or adjusted under 35 U.S.C. 154(b) by 0 days.

(21) Appl. No.: 15/159,540

(22) Filed: May 19, 2016

(65) Prior Publication Data
US 2016/0265616 A1    Sep. 15, 2016

Related U.S. Application Data

(63) Continuation of application No. PCT/EP2014/074859, filed on Nov. 18, 2014.

(30) Foreign Application Priority Data

Nov. 19, 2013    (DE) .................. 10 2013 112 734

(51) Int. Cl.
*F16F 9/512*    (2006.01)
*F16F 9/46*    (2006.01)
(Continued)

(52) U.S. Cl.
CPC ............ *F16F 9/512* (2013.01); *F16F 9/3488* (2013.01); *F16F 9/464* (2013.01); *F16F 9/19* (2013.01);
(Continued)

(58) Field of Classification Search
CPC .... F16F 9/325; F16F 9/46; F16F 9/462; F16F 9/512; F16F 9/3488; F16F 9/348; F16F 9/464; F16F 9/50; B60G 17/08
See application file for complete search history.

(56) References Cited

U.S. PATENT DOCUMENTS 4,749,069 A * 6/1988 Knecht .................. F16F 9/46
                                                             188/266.6
5,046,755 A    9/1991 Runkel et al.
(Continued)

FOREIGN PATENT DOCUMENTS

DE    38 30 343 A1    3/1990
DE    3910119 A1    10/1990
(Continued)

OTHER PUBLICATIONS

International Search Report dated Mar. 4, 2015 of international application PCT/EP2014/074859 on which this aplication is based.
(Continued)

*Primary Examiner* — Melanie Torres Williams
(74) *Attorney, Agent, or Firm* — Ewers & Hasselmann PLLC

(57) ABSTRACT

A damping strut with a hydraulic shock absorber has a damping volume filled with an incompressible damping fluid, a retract detection device, and a compression stage throttle having a disk valve with a valve disk. The damping fluid flows through the compression stage throttle during a retraction of the shock absorber and generates a damping strut resistance force. A biasing means for biasing the valve disk against a through flow direction of the disk valve has a force-distance-characteristic curve in a range of the valve stroke of the valve disk, a first derivative of which is substantially zero and has a value (K). A bias regulator couples the biasing means with the valve disk and is interconnected with the retract detection device. When the retraction of the shock absorber starts, the value (K) is raised during a first period of time starting at a single start value.

27 Claims, 9 Drawing Sheets

(51) Int. Cl.
*F16F 9/348* (2006.01)
*F16F 9/19* (2006.01)

(52) U.S. Cl.
CPC ..... *F16F 2228/066* (2013.01); *F16F 2238/04* (2013.01)

(56) References Cited

U.S. PATENT DOCUMENTS

| | | | |
|---|---|---|---|
| 5,222,759 A * | 6/1993 | Wanner | B60G 17/04 280/124.158 |
| 5,375,683 A * | 12/1994 | Huang | F16F 9/46 188/266.6 |
| 5,386,893 A | 2/1995 | Feigel | |
| 5,392,885 A | 2/1995 | Patzenhauer et al. | |
| 5,449,055 A * | 9/1995 | Geiling | F16F 9/465 188/266.6 |
| 7,147,207 B2 | 12/2006 | Jordan et al. | |
| 7,234,576 B2 | 6/2007 | Sirven | |
| 8,453,806 B2 | 6/2013 | Battlogg et al. | |
| 8,935,984 B2 | 1/2015 | Sasaki et al. | |
| 2013/0161138 A1 | 6/2013 | Barefoot | |
| 2016/0215849 A1 * | 7/2016 | Kurita | F16F 9/50 |

FOREIGN PATENT DOCUMENTS

| | | |
|---|---|---|
| DE | 4132262 A1 | 4/1993 |
| DE | 60310903 T2 | 10/2007 |
| DE | 102006054632 A1 | 5/2008 |
| DE | 102011002339 A1 | 10/2012 |
| EP | 2278185 A1 | 1/2011 |
| EP | 2357098 A2 | 8/2011 |
| EP | 2518365 A2 | 10/2012 |
| GB | 2223822 A | 4/1990 |
| TW | M437402 U | 9/2012 |
| TW | 201313528 A | 4/2013 |
| WO | 98/40231 A2 | 9/1998 |

OTHER PUBLICATIONS

Office Action issued in German Patent Application No. DE 10 2013 112 734.7 (from which this application claims priority), dated Jun. 8, 2014 and English language machine translation thereof.

Office Action issued in German Patent Application No. DE 10 2013 112 734.7 (from which this application claims priority), dated Jun. 13, 2017 and English language machine translation thereof.

Braess, H.-H.; Seiffert, U., Vieweg Handbuch Kraftfahrzeugtechnik, 2013, p. 755, and English language machine translation thereof.

Grundwissen, Bilstein, https://www2.bilstein.com/de/technologie-und-wissen/grundwissen/, downloaded on Jun. 19, 2017, and English language machine translation thereof.

Office Action issued in co-pending German Patent Application No. DE 10 2013 112 739.8 dated Aug. 8, 2014 and English language machine translation thereof.

Office Action issued in co-pending German Patent Application No. DE 10 2013 112 739.8 dated Jun. 19, 2017 and English language machine translation thereof.

Office Action and Search Report dated Apr. 23, 2018 issued in Taiwanese counterpart application No. 103139895 and English-language machine translation thereof.

U.S. Appl. No. 15/159,522, filed May 19, 2016, Thomas Ripa.

* cited by examiner

DAMPING STRUT WITH A HYDRAULIC SHOCK ABSORBER AND METHOD FOR OPERATING THE DAMPING STRUT

CROSS REFERENCE TO RELATED APPLICATIONS

This application is a continuation application of international patent application PCT/EP2014/074859, filed Nov. 18, 2014, designating the United States and claiming priority from German application 10 2013 112 734.7, filed Nov. 19, 2013, and the entire content of both applications is incorporated herein by reference.

FIELD OF THE INVENTION

The invention relates to a damping strut with a hydraulic shock absorber and a method for operating the damping strut.

BACKGROUND OF THE INVENTION

A damping strut in combination with a spring strut utilized as a wheel suspension for a bicycle is known. The damping strut has a hydraulic shock absorber that is a monotube shock absorber filled with a damping fluid. A damping piston is supported in the monotube shock absorber such that it can be displaced longitudinally for displacing the damping fluid. The damping piston has a plurality of damping openings. During retraction and extension of the damping strut, the damping piston is displaced in the monotube shock absorber, and the damping fluid is displaced by the damping piston such that the damping fluid flows through the damping openings. The flow of the damping fluid in the monotube shock absorber, in particular through the damping openings, is lossy, and results in a damping strut resistance force that counteracts the movement of the damping strut.

Requirements in particular with respect to the strength and the dynamic of the damping strut resistance force are applied to the damping strut during occurrence of diverse riding situations with the bicycle, wherein a ride with the bicycle with high safety and with high comfort is supposed to be enabled by the requirements. Thus, it is desirable, when, for example, the bicycle is driven over a high curbstone edge or a low stone, independent of the stroke position of the damping strut being thereby present, the damping strut resistance force of the shock absorber is in both cases first possibly low and increases smoothly with a slight increase in the following stroke course so that the highest damping strut resistance force is reached during reaching a maximum of the obstacle, thus still before the maximum amplitude of the stroke excitation by the obstacle.

At the beginning, the damping strut can be retracted fast by the damping strut resistance force, whereby the wheel can dodge the obstacle well without transmitting an overly impact from the curbstone edge or the stone to the frame of the bicycle. The wheel is maximally decelerated during reaching the maximum of the obstacle so that further (and therefore harmful) retraction of the wheel caused by the inertia of the unsprung masses is prevented, whereby a contact loss to the road is prevented. The safety as well as the comfort of the rider during riding is therefore increased and the fluctuation of the wheel load of the sprung wheel is reduced, so that the tyre-road contact is increased.

The stroke excitation is defined as the momentum that causes the movement of the damping strut during the influence duration of the momentum, that is, during the excitation duration. The stroke excitation maximum is the maximum stroke height of a theoretical, barely damped damping strut, wherein the maximum stroke height is caused by this momentum influence. The maximum of the obstacle is the maximum height difference of the obstacle in relation to the height level of the road surrounding the obstacle, wherein the maximum height difference has to be overridden by the damping strut during rolling over the obstacle.

The rider of the bicycle generally performs a rhythmic weight shift during pedaling, whereby the bicycle is brought in a rocking movement. When the rider of the bicycle initiates an abrupt braking manoeuvre, the nodding momentum thereby acting on the vehicle's center of mass leads to a strong retraction of the damping strut of the front wheel and simultaneously to a strong extension of the damping strut of the rear wheel. Pedalling induced rocking movements and braking induced retraction and extension movements of the damping strut are tendentiously perceived as being disturbing and can even, when having a too large extends, become a safety risk for the rider. It is therefore further desirable that the damping strut resistance force possibly increases fast and very strong during these undesired damping strut movements, whereby these stroke excitations are attenuated by the damping strut still before the damping strut can retract far, so that a ride with high comfort and with high safety is enabled.

SUMMARY OF THE INVENTION

It is an objection of the invention to provide a damping strut with a hydraulic shock absorber and a method for operating the damping strut, with which a comfortable and safe ride is enabled.

The object is solved by providing a damping strut including: a hydraulic shock absorber having a damping volume filled with an incompressible damping fluid; a retract detection device coupled with the hydraulic shock absorber and configured to detect a start and an end of a retraction of the hydraulic shock absorber; a compression stage throttle having a disk valve with a valve disk; the compression stage throttle being arranged so that damping fluid flows through the compression stage throttle in a direction opposite to a closing direction of the disk valve as the hydraulic shock absorber is retracted thereby generating a damping strut resistance force by the valve disk; the compression stage throttle having a biasing means configured for biasing the valve disk against a through flow direction of the disk valve; the biasing means having a force-distance-characteristic curve in at least one range of a valve stroke (x) of the valve disk, wherein a first derivative of the force-distance-characteristic curve is substantially zero ($F'=dF/dx \approx 0$) and has a bias value (K); the compression stage throttle having a bias regulator that couples the biasing means with the valve disk; and, the bias regulator being interconnected with the retract detection device and configured to raise the bias value (K) during a first period of time beginning at a start value as the retraction of the hydraulic shock absorber starts.

According to an aspect of the invention, the damping strut includes a hydraulic shock absorber that has a damping volume filled with an incompressible damping fluid, a retract detection device that is coupled with the shock absorber for detecting a start and an end of a retraction of the shock absorber, as well as a compression stage throttle having a disk valve with a valve disk. The damping fluid flows through the compression stage throttle during the retraction of the shock absorber, whereby a damping strut resistance force is generated by the valve disk. The compression stage throttle includes a biasing means for biasing the valve disk against the through flow direction of the disk valve. The biasing means has a force-distance-characteristic curve in at least a range of the valve stroke of the valve disk, wherein the first derivative of the force-distance-characteristic curve is substantially zero and has a value K. The compression stage throttle includes a bias regulator that couples the biasing means with the valve disk and that is interconnected with the retract detection device so that beginning with the start of the retraction of the shock absorber, the value K is raised from a single start value during a first period of time.

The bias regulator of the damping strut is preferably interconnected with the retract detection device so that the value (K) is reset to the start value as soon as the retract detection device detects an end of the retraction. Alternatively, the damping strut includes an extend detection device that is coupled with the shock absorber for detecting a start of an extension of the shock absorber. The extend detection device is interconnected with the bias regulator so that beginning with the extension of the shock absorber, the vale (K) is lowered to the start value within the duration of a second period of time.

The damping strut preferably includes a rebound stage throttle that is connected in parallel to the compression stage throttle. Therefore, the rebound stage throttle is connected in parallel to the disk valve and is flowed through by the damping fluid during the extension of the shock absorber, so that during the extension of the shock absorber the valve disk is pressed on a valve disk seat of the disk valve.

According to another aspect of the invention, an alternative damping strut is provided. The alternative damping strut has a hydraulic shock absorber that comprises a damping volume filled with an incompressible damping fluid, an extend detection device that is coupled with the shock absorber for detecting a start of an extension of the shock absorber, as well as a rebound stage throttle having a disk valve with a valve disk. The damping fluid flows through the rebound stage throttle during the extension of the shock absorber, whereby a damping strut resistance force is generated by the valve disk. The rebound stage throttle includes a biasing means for biasing the valve disk against the through flow direction of the disk valve. The biasing means has a force-distance-characteristic curve in at least a range of the valve stroke of the valve disk, wherein the first derivative of the force-distance-characteristic curve is substantially zero and has a value K. The rebound stage throttle includes a bias regulator that couples the biasing means with the valve disk and that is interconnected with the extend detection device so that beginning with the start of the extension of the shock absorber, the value K is raised from a single start value during a first period of time.

The bias regulator of the alternative damping strut is preferably interconnected with the extend detection device so that the value (K) is reset to the start value as soon as the extend detection device detects an end of the extension. According to another aspect of the invention, the alternative damping strut includes a retract detection device that is coupled with the shock absorber for detecting a start of a retraction of the shock absorber and is interconnected with the bias regulator so that beginning with the retraction of the shock absorber, the value (K) is lowered to the start value within a second period of time.

The alternative damping strut preferably includes a compression stage throttle that is connected in parallel to the rebound stage throttle. Therefore, the compression stage throttle is connected in parallel to the disk valve and is flowed through by the damping fluid during extension of the shock absorber, so that the valve disk is pressed on a valve disk seat of the disk valve during the retraction of the shock absorber.

A further alternative damping strut according to another aspect of the invention includes all features of both other alternative damping struts discussed above.

According to yet another aspect of the invention, a method for operating the damping strut is provided, the method including the steps of: starting the movement of the shock absorber; beginning with the start of the movement of the shock absorber, raising the bias (K) of the valve disk from the start value over a first period of time exclusively by the bias regulator.

The bias of the valve disk is preferably held on a maximum value as soon as the first period of time is reached. The direction of the movement of the shock absorber is then preferably reversed, wherein preferably beginning from the direction reversal of the shock absorber, the bias is lowered to the start value during the second period of time.

The invention is based on the following observations: Despite completely differently high stroke excitation maxima, the excitation duration of the stroke excitation caused by different obstacles, for example by a curbstone edge or by a low stone, and the excitation duration of the desired movements of the damping strut triggered thereby, are approximately equally long. This is true in particular until the reaching of the respective obstacle maximum, or of the respective stroke excitation maximum. The excitation duration of the stroke excitation changes over the range of the typical ride velocities of the bicycle only to a small extent and is considerably shorter than the often multiple times longer excitation duration that is caused by rocking excitations as well as by braking induced stroke excitations that trigger undesired movements of the shock absorber. In contrast, if the amplitudes of the stroke excitations of the desired and undesired shock absorber movements are compared with each other, no distinguishing quantitative feature between both groups can be recognized. The same is true for the retraction or extension velocities of the damping strut. These relationships are revealed both during the retraction and during the extension of the shock absorber.

The bias of the valve disk is obtained with the biasing means. Since the biasing means is coupled with the valve disk via the bias regulator, the bias of the valve disk can be controlled or "dosed" by the bias regulator. According to an aspect of the invention, the bias of the valve disk is controlled by the bias regulator such that during the start of the retraction of the shock absorber the bias corresponds to the start value. Starting from the start value, the effect of the biasing means on the valve disk is increased over time until the end of the retraction occurs or the first period of time has elapsed. The bias regulator attenuates the effect of the biasing means on the valve disk at the start of the retraction of the shock absorber such that, at the start of the retraction of the shock absorber, the disk valve is biased only with the start value. The attenuating effect of the bias regulator decreases from the start of the retraction of the shock absorber so that the bias force of the biasing means that is transmitted on the disk valve increases during the first period of time. At the end of the first period of time, the attenuating effect of the bias regulator on the transmission of the bias force of the biasing means on the disk valve is no longer present or at least reduced. The end of the first period of time does not necessarily coincide with the end of the retraction of the shock absorber and can be freely chosen in particular with respect to practical considerations.

The bias regulator is provided between the biasing means and the disk valve so that the strength of the mechanical coupling between the biasing means and the valve disk can be manipulated by the bias regulator. The valve disk is therefore always biased by the biasing means according to its characteristic curve. The level of the bias is set by the bias regulator during the first period of time. Only the intensity of the transmission of the bias force from the biasing means to the disk valve is correspondingly controlled by the bias regulator according to an aspect of the invention, so that the characteristic of the force-distance-characteristic curve of the biasing means remains unchanged at each point in time. As a result, the characteristic of the force-distance-characteristic curve of the bias of the valve disk also remains unchanged.

According to a further aspect of the invention, the first derivative of the force-distance-characteristic curve with respect to the valve stroke is substantially zero, whereby at each individual point in time the bias of the disk valve is constant. At different retraction velocities of the shock absorber, the disk valve is arranged at different valve strokes due to the corresponding different displacement effects of the damping fluid. Since the force-distance-characteristic curve is substantially constant over the valve stroke, the bias of the disk valve is independent from the retraction velocity of the shock absorber in each individual point at time.

According to an aspect of the invention, the biasing means and the valve disk are coupled via the bias regulator so that the force necessary for biasing the biasing means is generated by a pressure difference of the damping fluid on the disk valve, wherein the physical work necessary for biasing the biasing means is performed by the damping fluid that is flown out of the damping volume and did not yet pass the valve disk seat.

Since the bias of the disk valve in each individual point in time is independent from the retraction velocity of the shock absorber, the pressure difference of the damping fluid generated on the disk valve is only dependent on the bias of the valve disk of the biasing means, but it is not dependent on the current retraction velocity of the damping strut. Since this pressure difference generates, via the coupling over the bias regulator, the force that increasingly biases the elastic biasing means—wherein the damping fluid performs the physical work necessary thereto—the increase of the bias of the biasing means is also independent from the current retraction velocity of the shock absorber. Therefore, the first period of time that is necessary to raise the bias of the biasing means from the start value to the maximum value in order to bias the valve disk is also independent from the movement velocities of the damping strut and therefore always approximately equally long even at different stroke velocity curves of the damping strut, whereby the retraction resistance force of the shock absorber only depends in the same manner from its retraction duration.

If, for example, the bias regulator is provided such that it reduces the effect of the bias according to the force-distance-characteristic curve by 50% at the half of the first period of time, the bias of the valve disk results in the half of the maximum value of the value K independent from how high the retraction velocity of the shock absorber is. If, for example, the bias regulator reduces the transmission of the bias from the biasing means to the valve disk at 75% of the first period of time to 80%, the bias of the valve disk is 20% of the maximum bias at this point in time. The bias is again independent from the valve stroke to which the valve disk is currently raised due to the correspondent current retraction velocity.

The biasing means acts on the valve disk by the bias regulator only gradually and time delayed, wherein the strongest bias acts on the valve disk only at the end of the first period of time or at the end of the retraction, depending on which point in time occurs earlier. However, the bias of the valve disk is independent from its current valve stroke at each point in time of the retraction.

A wheel of a bicycle is for example suspended on the frame of the bicycle with the damping strut. For example, the bicycle drives towards a curbstone edge. At the point in time, at which the wheel impinges on the curbstone edge, a hard impact, that is, a stroke excitation with a high amplitude within a particularly short duration is transmitted from the curbstone edge to the wheel and therefore to the damping strut. The damping strut starts now with the retraction that is detected by the retract detection device, whereby the first period of time starts. The bias of the valve disk of the biasing means corresponds to the start value, independent from the strength of the impact and in particular independent from a stroke position of the damping strut currently being present at the start of the retraction. The bias of the valve disk is at a minimum with the start value at the beginning of the retraction, whereby the retraction velocity of the shock absorber is high, caused by the great strength of the impact. For example, an increase of the bias of the biasing means and therefore of the bias of the valve disk of the shock absorber by means of the bias regulator occurs only very gradually over the retraction stroke, since it is enabled for the shock absorber to perform a long retraction stroke within the (for each stroke excitation always equally long) first period of time that is required by the bias regulator to maximally bias the valve disk. The duration of the first period of time can ideally be set such that the highest damping strut resistance force is only reached when the obstacle maximum is reached by the damping strut. In contrast, if the first time duration is chosen such that it has not elapsed when reaching the maximum retraction stroke at the obstacle maximum, the maximum damping strut resistance forces are not even obtained with such obstacles, whereby a maximum comfort setting of the shock absorber is obtained.

The possibly complete absorption of the described obstacle is only possible since the valve disk has the opening characteristic curve according to an aspect of the invention, so that the valve disk has a very high opening degree at the particularly high current retraction velocity of the shock absorber, which is particularly high in a short term during overriding a curbstone edge, without increasing the bias of the valve disk. The damping force of the disk valve at each individual point in time is therefore independent from the current, in this case very high retraction velocity, whereby a hardening of the shock absorber is first completely prevented and the damping strut resistance force is purely determined from the already elapsed part of the first period of time and the bias value K is transmitted by the bias regulator. The first period of time is thereby, despite the high movement velocity of the shock absorber, simultaneously approximately always equally long.

The overridden height difference during riding the wheel up the curbstone edge is compensated by the damping strut, whereby the unevenness caused by the curbstone edge is well overridden and barely perceived by a bicycle rider. During reaching the obstacle maximum, the wheel is already maximally decelerated, so that a further, harmful retraction of the damping strut and of the wheel is prevented, and therefore a contact loss to the road is also prevented.

Since the excitation duration of the damping strut, as described above, only varies in a very limited manner for different obstacle types (in particular until reaching its obstacle maxima and its respective stroke excitation maxima), caused by the preset and always equally long first period of time which the bias regulator needs to raise the bias of the biasing means to its maximum value starting from the first impingement of the wheel on the obstacle, the shock absorber reliably generates the highest damping strut resistance force only in the range of these obstacle maxima—independent from how high its retraction velocity is and independent from the respective obstacle type and the stroke amplitudes it reaches.

In contrast, the damping strut with the shock absorber according to an aspect of the invention behaves differently, when an undesired movement caused by a long enduring stroke excitation occurs, as it is generated in a typical manner, for example, during pedaling or during a braking process initiated by the rider. A fast increase of the bias of the biasing means over the retraction stroke of the shock absorber immediately occurs, since it is only enabled for the long retracting shock absorber in the (for each stroke excitation always equally long) first period of time that the bias regulator needs to raise the value K from its start value to the maximum value and therefore to maximally elastically bias the valve disk to perform a very short retraction stroke relative to the maximum amplitude of the excitation stroke. Higher damping strut resistance forces are therefore built up already at the beginning of the retraction stroke within a fraction of the maximum stroke amplitude considerably before the stroke excitation maximum, so that for example a brake diving of the front wheel or a rhythmic weight shift of the bicycle rider during pedaling are damped strongly by the damping strut while increasing the damping strut resistance force. But this is only possible, since the disk valve can generate sufficient and most notably equally high damping forces during the thereby prevailing, rather low, but definitely strongly varying current retraction velocities of the damping strut, since opening characteristic curve of the valve disk according to an aspect of the invention is independent from the current retraction velocity of the damping strut due to its bias being independent from the opening degree of the valve disk. The damping strut resistance force is therefore purely determined by the already elapsed portion of the first period of time and the thereby obtained bias value K by the bias regulator and the first period of time is simultaneously approximately always equally long, despite the different movement velocities of the shock absorber.

The described behavior of the damping strut is particularly advantageous, when the front wheel of the bicycle impinges on a large obstacle like a curbstone edge during the beginning of a long enduring stroke excitation, for example, during a strong braking process, thus during a very strong increase of the damping strut resistance force in relation to the retraction stroke. The opening degree of the valve disk immediately increases without further biasing the biasing means, so that the retraction stroke performed by the damping strut simultaneously and nearly free of delay becomes longer, while the bias regulator raises the bias K of the biasing means from the start value to the maximum value within the (for each stroke excitation always equally long) first period of time. Therefore, the increase of the damping strut resistance force immediately flattens over the retraction stroke of the damping strut. The damping strut therefore releases more retraction stroke for the occurring obstacle nearly free of delay, whereby it can be absorbed substantially better. If the obstacle is overridden during the further occurring braking process, without that the maximum bias and therefore the maximum damping strut resistance force is thereby reached, the increase gradient of the damping strut resistance force course is immediately afterwards set up over the further retraction stroke of the shock absorber, which prevailed before the impingement of the wheel on the curbstone edge, whereby the brake diving that would now result is prevented.

By the realization of the damping strut and the operation of the damping strut according to an aspect of the invention, the damping strut has a dynamically generated force-distance-characteristic line that varies dependent from the retraction duration but independent from the stroke velocity. This characteristic leads to a damping strut behavior during the retraction stroke similar to a vehicle spring system that can be changed in its force-distance-characteristic curve, since the vehicle spring system is also independent from the stroke velocity and has also a force-distance-characteristic curve. Due to these features, the damping strut according to an aspect of the invention emulates, in particular during the retraction, in many application areas a so-called active spring system. This acts against undesired retraction stroke movements (for example, the mentioned brake diving), by a dynamic increase of the spring characteristic line of the spring system of the vehicle, by the spring system compressing the vehicle spring (for example, a coil spring) via an actuator controlled by a sensor system and control electronics, wherein the vehicle spring deflects during the stroke excitation caused by braking and the spring system simultaneously compresses the vehicle spring from its end on the vehicle body and in addition to the deflection. Therefore, as a result, exactly like the damping strut according to an aspect of the invention, the force-resistance-characteristic curve of the wheel suspension is dynamically increased and the brake diving is strongly attenuated.

However, the dynamic characteristic curve increase occurs with the damping strut according to an aspect of the invention nearly free of delay and substantially faster than with the active spring system that is mostly electronically controlled via a sensor system/actor system, since the reaction time of the arrangement according to an aspect of the invention only depends on the detection of the start of the movement process of the damping strut and the masses of its valve arrangement, but not additionally on the reaction time of a sensor system/electronic system/actor system that first has to capture and process the wheel movement with all its quantitative values during the complete process and subsequently correspondingly continually counter control the wheel movement under great force and energy application. Since only the bias of the valve system has to be modulated with the damping strut according to an aspect of the invention, a similar result can be realized with a system that is considerably lighter due to the few and substantially simpler components, so that it is particularly advantageously employed in vehicles with a low available energy, like, for example, bicycles, e-bicycles and electric cars.

As soon as the retraction phase of the damping strut has ended and the extension phase starts, the biasing means begins to reset its bias to the start value within the second period of time. The second period of time is considerably shorter, in particular it is shorter than half of the first period of time that is required by the bias regulator to raise the bias of the biasing means from the start value to the maximum value. As soon as a new retraction of the shock absorber occurs, the bias of the biasing means is reset to the start value, so that the bias of the disk valve and therefore the damping strut resistance force has again a minimal value. As a result during the new start of the retraction the course of the damping strut resistance force is therefore mostly independent from the stroke position of the shock absorber during the start of the retraction.

Since the rebound stage throttle is connected in parallel to the compression stage throttle according to the first alternative damping strut, the compression stage throttle is respectively connected in parallel to the rebound stage throttle according to the second alternative damping strut. The valve disk is moved back to the valve disk seat at the end of the retraction, and respectively of the extension of the shock absorber. The disk valve is therefore closed at the new start of the retraction, and respectively the extension of the shock absorber, whereby the damping strut resistance force is generated despite the reduced bias of the valve disk at the start of the retraction.

The description for the first alternative damping strut can also be applied in an analogous manner for the second alternative damping strut and the third alternative damping strut.

The biasing means is preferably elastic, so that a bias on the valve disk can be generated. The biasing means is immediately coupled with the valve disk via the bias regulator and the range of the valve stroke of the valve disk is much smaller than the stroke of the biasing means so that the force-distance-characteristic curve has a substantially constant value in the range of the valve stroke. According to another aspect of the invention, the biasing means is elastic, so that a bias on the valve disk can be generated, wherein the biasing means is indirectly coupled with the valve disk via the bias regulator by a gear with which the valve stroke of the valve disk and the stroke of the biasing means are arranged in a gear ratio with respect to each other so that the force-distance-characteristic curve has a substantially constant value in the range of the valve stroke.

The gear is preferably a lever, wherein its lever arm acting on the valve disk is longer than its lever arm acting on the biasing means. The biasing means is preferably formed by a coil spring and the bias regulator is preferably formed by a clutch, with which the spring force of the coil spring can be controlled, via which the coil spring interacts with the valve disk for generating the bias. The clutch is preferably a transmission rod with a friction clutch, wherein the transmission rod is supported between the coil spring and the valve disk, so that the spring force of the coil spring can be transmitted to the valve disk via the transmission rod. The transmission rod is divided into two halves by the friction clutch, wherein the one half engages longitudinally displaceable in the other half. During moving of the two halves relative to each other, a friction force acts against the spring force. Since the two halves of the transmission rod that can be moved into one another are formed with tapering cross sections, the friction force changes depending on the degree of the engagement. Further, the friction clutch preferably comprises a stop that, when at least one of the halves of the transmission rod lies on the stop, the halves of the transmission rod of the friction clutch are in maximum engagement.

As an alternative, it is preferred that the biasing means is formed by a gas spring and the bias regulator is formed by a pressure reduction valve, with which the spring force of the gas spring can be controlled, and via which the gas spring interacts with the valve disk for generating the bias.

Furthermore, according to an aspect of the invention the biasing means is an electromagnet and the bias regulator is an electric current control circuit, via which the strength of the magnetic field generated by the electromagnet can be controlled, and via which the electromagnet interacts with the valve disk for generating the bias. According to another aspect of the invention, the biasing means is a permanent magnet and the bias regulator is a positioning device, with which the permanent magnet can be positioned at variable distances relative to the valve disk. The magnetic force of the permanent magnet interacts with the valve disk, so that the generating of the bias can be controlled by the magnetic force of the permanent magnet.

The range of the valve stroke is preferably the complete valve stroke of the valve disk. It is further preferred that the start value is zero.

With the preferred method for operating the damping strut, the first period of time is between 0.01 and 0.8 seconds, in particular between 0.05 and 0.5 seconds. This first period of time is preferably suitable to comfortably damp retraction movements with the damping strut.

According to another aspect of the invention, the raising of the bias of the valve disk from the start value to the constant value during the first period of time occurs linearly, degressively or progressively. Moreover, according to another aspect of the invention, the constant value of the bias of the valve disk is chosen such that the damping strut resistance force generated by the valve disk is so high that after the elapse of the first period of time, the shock absorber does not retract and is therefore rigid during the occurrence of the maximal admissible retraction velocity of the shock absorber.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
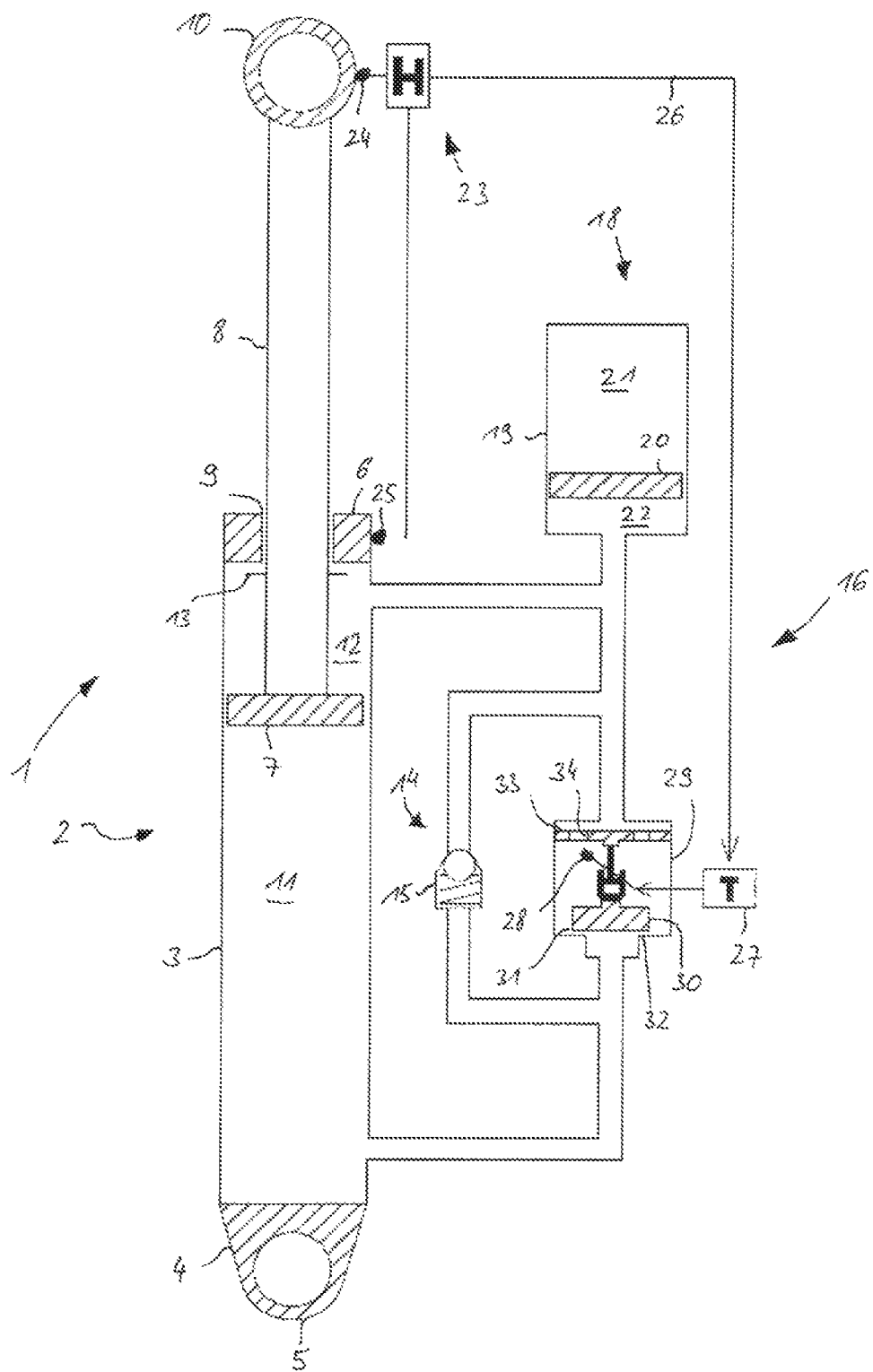
FIG. 1 is a schematic cross section view of a first alternative damping strut according to an example embodiment of the invention.

FIG. 1 shows a damping strut 1 that includes a shock absorber 2. The shock absorber 2 has a damping cylinder 3 that includes a damping cylinder head 4, seen in FIG. 1 on its lower side, wherein a wheel eye 5 is formed on the damping cylinder head 4. The wheel eye 5 is provided for receiving a wheel, wherein the wheel suspension of the wheel is provided by the damping strut 1. Further, the damping cylinder 3 includes on a side facing away from the damping cylinder head 4 a damping cylinder floor 6, wherein a volume is formed between the damping cylinder head 4 and the damping cylinder floor 6, wherein the volume is filled with an incompressible damping fluid, for example oil. A damping piston 7 with a damping piston rod 8 is arranged in the volume such that it can be longitudinally displaced, wherein the damping piston rod 8 is guided through an opening 9 in the damping cylinder floor 6. A frame eye 10 is formed on the outer longitudinal end of the damping piston rod 8, wherein the frame eye 10 is provided to be pivotably attached to a vehicle frame. The volume of the damping cylinder 3 is divided by the damping piston 7 in a damping volume 11 and a counter volume 12, wherein the damping volume 11 is arranged on the side facing towards the damping cylinder head 4 and the counter volume 12 is arranged on the side facing towards the damping cylinder floor 6. A stop 13 is provided on the damping piston rod 8, wherein the stop 13 lies on the damping cylinder floor 6 when reaching the maximum stroke of the damping strut 1.

The damping volume 11 and the counter volume 12 are connected fluidly conductive with each other with a damping fluid conduit, so that the damping fluid communicates between the damping volume 11 and the counter volume 12 and the damping piston 7 is moved back and forth. During the retraction of the shock absorber 2, the damping piston 7 moves in a direction toward the damping cylinder head 4, so that the damping volume 11 becomes smaller and the damping fluid is displaced from the damping volume 11 to the counter volume 12. During the extension of the shock absorber 2, the damping volume 11 becomes larger, wherein the counter volume 12 becomes smaller, so that damping fluid is transported from the counter volume 12 to the damping volume 11. The overflowing of the damping fluid from the damping volume 11 to the counter volume 12 and reverse is lossy, whereby a resistance force of the damping strut 1 that counteracts the retraction (and respectively the extension), of the damping strut is generated.

Since the damping piston rod 8 extends in the damping cylinder 3 depending on the stroke position of the shock absorber 2 during the movement of the damping piston 7 in the damping cylinder 3, the resulting displacement effect of the damping piston rod 8 has to be compensated by a volume compensation device 18. The volume compensation device 18 is built in the damping fluid conduit between the damping volume 11 and the counter volume 12 and includes a compensation cylinder 19, in which a compensation piston 20 is arranged such that it can be longitudinally displaced. The side of the compensation piston 20 facing towards the damping fluid confines a compensation volume 22 in the compensation cylinder 19, wherein the compensation volume 22 is flooded by the damping fluid. The side of the compensation piston 20 facing away from the damping fluid confines a buffer volume 21 in the compensation cylinder 19, wherein the buffer volume 21 is filled with a compressible fluid, for example air. The compensation piston 20 is arranged displaced in the compensation cylinder 19 corresponding to the displacement effect of the piston rod 8, so that the change of the size of the counter volume 12 is compensated with the compensation volume 22.

The damping strut 1 further includes a rebound stage throttle 14 and a compression stage throttle 16 that are built in the damping fluid conduit in parallel to each other. The rebound stage throttle 14 includes a rebound stage valve 15 that is formed as a non-return valve, that is in a closed position during the retraction of the shock absorber 2 and in an open position during the extension of the shock absorber 2. The compression stage throttle 16 is in an analogous manner flowed through during the retraction of the shock absorber 2 and not flowed through during the extension of the shock absorber 2. The damping strut resistance force is therefore determined during the retraction of the shock absorber 2 by the flow conditions in the compression stage throttle 16 and during the extension of the shock absorber 2 by the flow conditions in the rebound stage throttle 14.

The rebound stage valve 15 is formed with a biased sphere, wherein the sphere is pressed on a seat during the retraction of the shock absorber 2 and is lifted from the seat under overcoming its bias during the extension of the shock absorber. The flow conditions around the sphere during the retraction of the shock absorber 2 are determined, among others, by the strength of the bias of the sphere, so that the damping strut resistance force during the extension of the shock absorber 2 can be set up by a corresponding dimensioning of the bias.

The compression stage throttle 16 includes a retract detection device 23 that is formed by a frame distance sensor 24, a wheel distance sensor 25, and a signal line 26. The frame distance sensor 24 is attached to the frame eye 10, whereas the wheel distance sensor 25 is attached to the damping cylinder floor 6. The frame distance sensor 24 and the wheel distance sensor 25 interact with one another such that the beginning and the end of the retraction of the damping strut 1 is detected by the retract detection device 23. A corresponding signal is provided on the signal line 26.

The compression stage throttle 16 further comprises a disk valve that is formed by a valve disk 30 and a valve disk seat 32. The disk valve is built in the damping fluid conduit such that the valve disk 30 is pushed away from the valve disk seat 32 by the flow of the damping fluid in the damping fluid conduit during the retraction of the shock absorber 2, which results in a valve disk opening 31. Flow losses in the flow of the damping fluid result from the flowing of the damping fluid through the valve disk opening 31, wherein a pressure difference of the damping fluid on the disk valve and therefore the damping strut resistance force results from the flow losses during the retraction of the shock absorber 2. In contrast, the valve disk 30 is pushed on the valve disk seat 32 by the damping fluid during the extension of the shock absorber 2, so that a through flow of the disk valve is prevented. A valve stroke of the valve disk 30 corresponds to the movement distance of the valve disk 30 with respect to the valve seat 32, so that a valve opening 31 between the valve disk 30 and the valve seat 32 results.

A biasing means 28 is provided for biasing the valve disk 30, wherein the biasing means 28 is coupled with the valve disk 30 via a bias regulator 27 configured for transmitting a bias force on the valve disk 30. The bias regulator 27 is connected to the signal line 26, whereby a respective signal at the start and at the end of the retraction of the shock absorber 2 is transmitted from the retract detection device 23 to the bias regulator 27.

The biasing means 28 is formed by an electromagnet, with which a magnetic field can be generated. The magnetic field interacts with the disk valve 30 such that it biases the valve disk 30 in a direction relative to the valve seat 32. Caused by the flow conditions of the damping fluid typically occurring in the praxis in the shock absorber 2, and in particular in the damping fluid conduit, the valve strokes of the valve disk 30 are so low that with an unchanged strength of the magnetic field, with which the bias of the valve disk 30 is generated by the biasing means 28, the bias of the valve disk 30 is substantially equal at all in the praxis conceivable stroke positions. The bias of the valve disk 30 has therefore a force-distance-characteristic curve over the complete valve stroke of the valve disk 30, wherein the first derivative of the force-distance-characteristic curve is substantially zero and has therefore a constant value K, whereby the bias of the valve disk 30 is equally high independent from a current valve stroke of the valve disk 30.

The current valve stroke of the valve disk 30 substantially results from the current retraction velocity of the shock absorber 2. At a high retraction velocity, the valve stroke is high and vice versa. Since the bias of the valve disk 30 is independent from the current valve stroke, the bias of the valve disk 30 is independent from the current retraction velocity.

The bias regulator 27 is formed by an electric current control or control circuit, with which the electromagnet is operated and the strength of the magnetic field generated by the electromagnet is controlled, wherein the electromagnet interacts via the magnetic field with the valve disk 30 to generate the bias. The bias regulator 27 controls the strength of the magnetic field generated by the electromagnet such that, as soon as the bias regulator 27 has received the signal for the start of the retraction, the strength of the magnetic field generated by the electromagnet is raised starting from a start value. This increase extends over a predetermined first period of time, wherein the strength of the magnetic field generated by the electromagnet has a maximum value at the end of the first period of time. If the signal indicating that the retraction of the shock absorber 2 is ended reaches the bias regulator 27 via the signal line 26, the electric current control acts such that the strength of the magnetic field generated by the electromagnet is set again to the start value.

A high requirement is applied to the damping strut 1, when the wheel has to override a steep unevenness, for example a curbstone edge. The impingement of the wheel on the curbstone edge is initiated with a high impact from the curbstone edge to the wheel, so that the shock absorber 2 begins with the retraction. The signal in the signal line 26 is thereby generated by the retract detection device 23, wherein the signal indicates the beginning of the retraction. The first period of time begins simultaneously with the beginning of the retraction.

The strength of the magnetic field, with which the bias of the valve disk 30 can be generated by the biasing means 28, can be "dosed" or controlled by the bias regulator 27. The strength of the magnetic field is set at minimal value by the bias regulator 27 at the beginning of the first period of time that begins with the start of the retraction of the shock absorber 2. The valve disk 31 can therefore easily be lifted from the valve seat 32. Since the strength of the bias is substantially independent from the retraction velocity of the shock absorber 2, the shock absorber 2 can equally sensitively react on differently strong collisions on the wheel at the beginning of the first period of time. The shock absorber 2 is therefore soft in the damping effect at the beginning of the retraction of the shock absorber 2, so that a strong collision can be well compensated by the damping strut 1 during the impingement of the wheel on the curbstone edge.

The first time duration is chosen sufficiently long, namely between 0.01 and 0.8 seconds, so that the strong collision that triggered the retraction of the shock absorber 2 can be softly damped.

The biasing means 28 is controlled by the bias regulator 27 from the beginning of the first period of time such that the strength of the magnetic field is continually increased until the end of the first time duration. Subsequent to the end of the first period of time, the strength of the magnetic field remains invariantly high, until the end of the retraction of the shock absorber 2 is detected by the retract detection device and a signal is transmitted via the signal line 26 to the bias regulator 27.

It is achieved by the interaction of the bias regulator 27 with the biasing means 28 that the characteristic of the bias of the valve disk 30 (first derivative of the force-distance-characteristic curve is substantially zero) is invariant during the first period of time and until the end of the retraction, whereas the level of the bias is raised during the first period of time beginning at the start value (in particular at a value that is zero).

The rebound stage throttle 15 is flowed through by the damping fluid during the retraction of the shock absorber 2, whereby flow losses are generated. A pressure distribution is thereby set up in the damping fluid conduit and in the compression stage throttle 16, wherein the pressure distribution leads to the closing of the disk valve since the valve disk 30 is pressed on the valve seat 32. The valve disk 30 is therefore brought in its start position for a new retraction.

Figure 2:
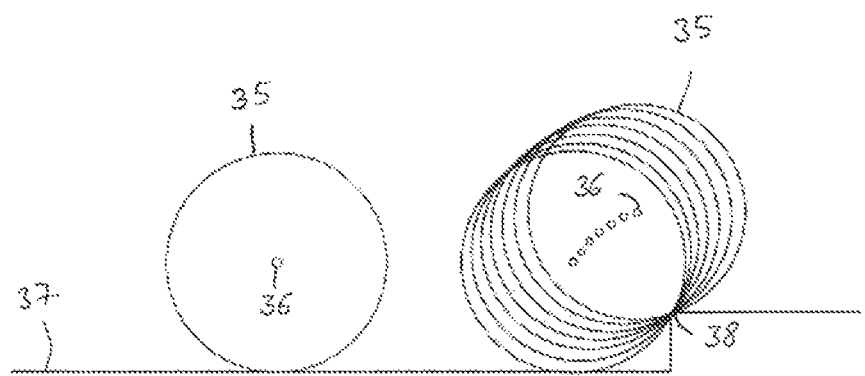
FIG. 2 shows a sketch of the kinematic conditions, when a wheel drives on a curbstone edge according to an example embodiment.
Figure 3:
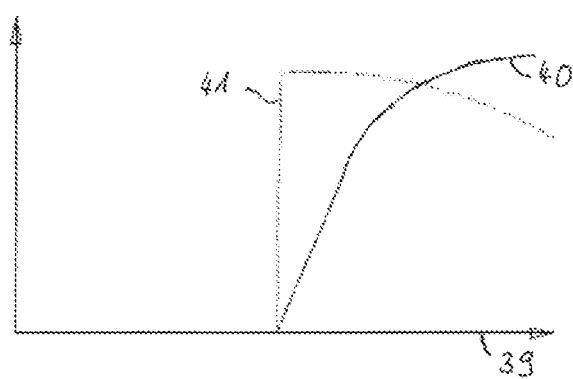
FIG. 3 is a diagram of the temporal course of the retraction distance and the retraction velocity when driving up the curbstone edge according to an example embodiment.

The conditions described above are qualitatively shown in FIGS. 2 to 9. In FIG. 2, the kinematic conditions are shown, when a wheel 35 that has a wheel hub rolls on a street 37 with a curbstone edge 38. For these kinematic conditions, FIG. 3 shows a diagram in which the retraction stroke 40 and the retraction velocity 41 of the damping strut 1 are plotted over a time axis 39. It can be seen that, as soon as the wheel 35 impinges on the curbstone edge 38, the retraction velocity 41 increases and the retraction stroke 40 plotted over time first includes a steep gradient that can be described as a steep, approximately linear rise from the beginning of the stroke over a large part of the stroke course. Only toward the end of the retractions stroke, the gradient becomes more and more flat. The course of the retraction velocity over such an obstacle is therefore in the approximately linear range of the stroke being approximately constant and having a quantitatively extremely high value. Therefore, a very strong impact is transmitted on the wheel 35. If a damping strut generates already at this point in time, that is at the beginning of such a stroke, very high damping strut resistance forces, the impact is damped very hard and leads to a very strong transmission of the excitation to the frame of the so damped vehicle and therefore on the rider. For this reason, the components of the damping strut 1 are coupled and interconnected with one another such the value K of the bias of the biasing means 28 of the valve disk 30 starts always at a single start value that is particularly low or zero at the beginning of such a stroke of the damping strut 1 and that is raised to the maximum value over the first period of time, whereby such an impact is softly damped and leads to a weak transmission of the excitation to the frame of the so damped vehicle and therefore to the rider. The maximum damping strut resistance forces are already reached in the range of the stroke excitation maximum 56 by a maximum transmission of the bias on the valve disk 30 by the bias regulator 27, so that the retraction of the damping strut 1 and therefore of the wheel 35 of the vehicle is maximal decelerated in order to prevent a further, harmful retraction and therefore a contact loss of the wheel 35 to the street 37.

Figure 4:
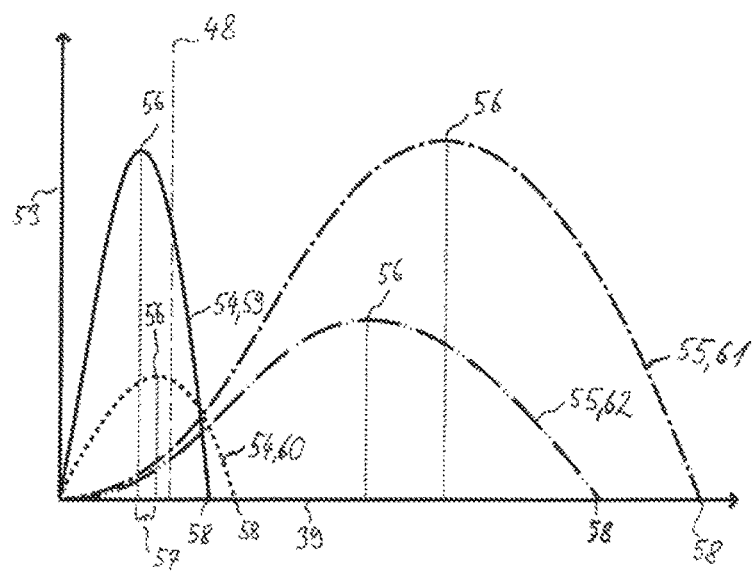
FIG. 4 shows various stroke excitations of the damping strut with respective specific excitation durations, stroke amplitudes and stroke velocities according to an example embodiment of the present invention.

In FIG. 4, the course of various stroke amplitudes of a theoretical, barely damped damping strut on the front wheel of a bicycle is shown over the time axis 39 during stroke excitations acting on the bicycle. The stroke excitations respectively include a stroke excitation maximum 56. During a stroke excitation of the front wheel by obstacles 59, 60, that is during overriding the obstacle maximum by the front wheel, and therefore at a maximum height difference of the obstacle to the level of the road directly surrounding the obstacle, a stroke excitation maximum 56 follows only a short time later, since the barely damped damping strut further compresses shortly also after the obstacle maximum is reached due to the mass inertia of the unsprung masses. Each stroke excitation can be divided in two areas: an area before reaching the stroke excitation maximum 56 that deals with a retraction excitation, and an area after reaching the stroke excitation maximum 56 that deals with an extension excitation of the damping strut. The gradient of the curves represents the respective retraction/extension velocity of the theoretical, barely damped damping strut over the stroke excitation. The different excitation duration of the stroke excitations can be seen in the diagram over the time axis 39 as the time ray from the intersection point of the axes 39, 53 to the intersection point 58 of the curve of the respective stroke excitation with the time axis 39. It is marked by a reference sign if the respective stroke excitation triggers a desired movement 54 or an undesired movement 55 of the damping strut 1. It can be well seen that stroke excitations by obstacles (curbstone edge 59; low stone 60) that trigger the desired movements 54 are substantially shorter than stroke excitations that are, for example, induced by braking forces 61 or by pedaling 62 and that trigger undesired movements 55. It is furthermore shown that the excitation duration over diverse obstacles 59, 60, in particular until the reaching of the obstacle respective stroke excitation maxima 56, is within a temporal very narrow range 57. The reference sign 48 marks a line, wherein the intersection of the line with the time axis 39 represents the end of the first period of time. The preset first period of time of the damping strut according to an example embodiment of the invention therefore extends on the time axis 39 from the intersection point of the axes 39, 53 to this point. The intersection point of the line 48 with the respective graph of the stroke excitations 59, 60, 61, 62 shows, in relation to the type of excitation, at which a current height of the excitation amplitude of the respective stroke excitation the highest damping forces of the damping strut 1 are reached according to an example embodiment of the invention. It can be clearly recognized that with the stroke excitations 61, 62 that trigger the undesired, stroke excitations 55, the highest damping forces are present already at a fraction of the maximum stroke amplitudes, even long before reaching the stroke excitation maxima 56, while during the stroke amplitudes of the desired damping strut movements 54, the damping forces are reached only at or shortly after reaching the stroke excitation maximum 63. If the end of the time duration 59 can only be reached after reaching the stroke excitation maximum 63, the maximum damping strut resistances forces of the damping strut 1 are not even reached. Since the force-distance-characteristic line of the biasing means is substantially constant in the range of the valve stroke, the first derivative in this range is substantially zero (F'=dF/dx≈0), and the damping strut resistance force is independent from the respective movement velocity of the damping strut 1. The pressure difference of the damping fluid generated on the valve disk 30 is therefore independent from the movement velocity and the force acting on the biasing means 28. This is the case, when the biasing means 28 and the valve disk 30 are coupled with the damping strut 1 via the bias regulator 27 so that the force necessary for biasing the biasing means 28 is generated by the pressure difference of the damping fluid generated on the valve disk 30. The damping fluid thereby performs the physical work that is necessary for increasingly biasing the biasing means 28 by a small amount of damping fluid that, coming from the damping volume 11, did not yet pass the valve disk seat 32. The first period of time that the bias regulator 27 requires for raising the biasing means 27 from the start value to the highest value of its bias is therefore always equally long for all stroke excitations 59, 60, 61, 62 and reaches its end 48 always after the same time after the beginning of the respective stroke excitations 59, 60, 61, 62.

The gradients of the stroke excitations 60 and 61 are equally steep in ranges, whereby also the retraction velocities of the undamped damping strut are almost identical in these ranges of the stroke excitations. The amplitudes of the stroke excitations 59 and 60 are approximately equally high. It is therefore well to be recognized that neither the stroke excitations nor the movement velocities are suitable for distinguishing desired and undesired stroke excitations of the damping strut and accordingly for regulating the damping strut resistance force. The damping strut 1 is thereby in its damping strut resistance force particularly advantageous independent both from the movement velocities and the stroke amplitudes as direct influence factors.

Figure 5:
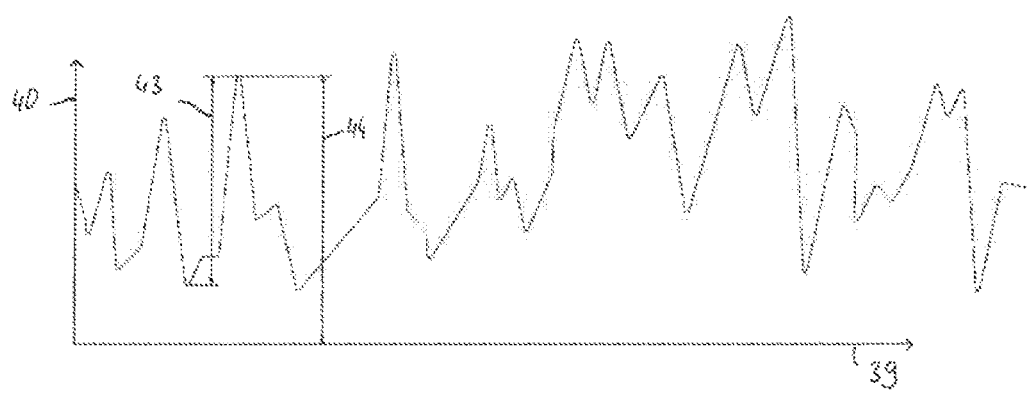
FIG. 5 is a diagram that shows retraction distances in dependence on the time during riding on uneven underground according to an example embodiment.

In FIG. 5, the retraction stroke 40 is plotted over the time 39, when the wheel 35 rolls over the street 37 with unevenness. A relative stroke of the damping strut 1 is denoted with reference number 43 and an absolute stroke of the damping strut 1 is denoted with reference number 44. The real movement distance that is covered by the damping strut 1, from the last stroke position at which a direction change of the stroke occurred, to the stroke position of the destination point in time is denoted as a relative stroke of the damping strut 1. In contrast, the imaginary movement distance that the damping strut 1 would need from its maximal extended stroke position to the stroke position of the destination point in time is denoted as absolute stroke. The value of the bias K of the biasing means of the damping strut 1 is always raised from a single start value during the first period of time from the impingement of the wheel on an obstacle, for the reasons already described above in conjunction with the description of FIG. 2. At the moment, at which the wheel 35 impinges on an obstacle, the damping strut 1 begins with a relative stroke. It is therefore required that the start value is present at each beginning of a relative stroke of the damping strut 1 and the bias with its value K is raised during the first period of time during the following relative stroke.

In contrast, while the wheel 35 rolls over the street 37, the damping strut 1 is always in another range of its absolute stroke and therefore every time in a different stroke position when the wheel 35 impinges on an obstacle. The bias value K of the biasing means is therefore independent from the absolute stroke and the thereby resulting stroke position of the damping strut 1. The damping strut 1 is therefore particularly configured by the interconnection and the coupling of its components that the start value of the bias value K of the biasing means 28 of the valve disk 30 is present on the valve disk 30 on the respective reversal point between the extension and the retraction of the damping strut 1 and is raised during further retraction of the damping strut during the first period of time. Alternatively, the damping strut 1 is configured by the interconnection of the coupling of the components of the damping strut 1 that the start value of the bias value K of the biasing means 28 of the valve disk 30 is present on the valve disk 30 on the reversal point between the retraction and the extension of the damping strut 1 and is raised during the further extension of the damping strut 1 during the first period of time.

Figure 6:
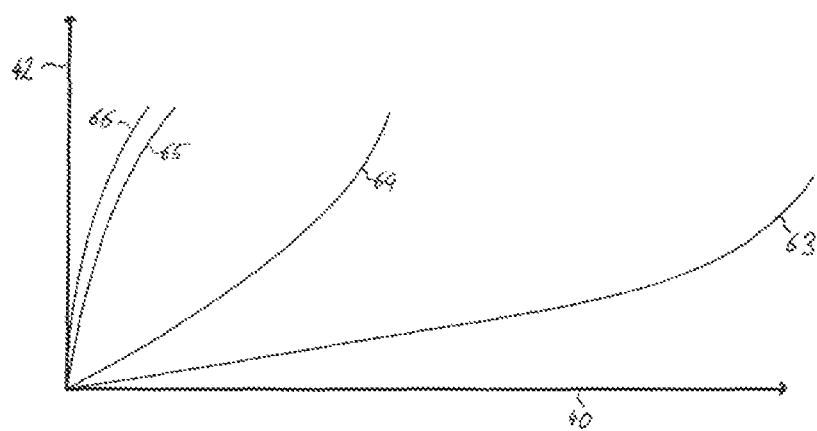
FIG. 6 shows characteristic curves of the damping strut according to an example embodiment of the invention.

In FIG. 6, a characteristic curve of the damping strut resistance force 42 of the damping strut 1 is shown over its retraction stroke 40, when the damping strut 1 is exposed to the different stroke excitations shown in FIG. 4 until its respective stroke excitation maximum. The reference number 63 marks the damping strut resistance force curve plotted over the stroke excitation 66 of the curbstone edge, the reference number 64 marks the damping strut resistance force curve plotted over the stroke excitation 60 of a stone, the reference number 65 marks the damping strut resistance force curve over the stroke excitation 61 during the braking process and the reference number 66 marks the damping strut resistance force course over the stroke excitation 62 by pedaling induced rocking. Undesired damping strut movements that are triggered by stroke excitations 61, 62 trigger damping strut resistance force curves 65, 66 with extremely steep gradients, whereby maximum damping strut resistance forces are already caused at extremely small retraction distances.

Desired shock absorber movements that are triggered by stroke excitations 59, 60 include damping strut resistance force curves 63, 64 with flat gradients that increase smoothly from a minimum start value. They reach their highest damping strut resistance forces at the respective obstacle maximum, but after different retraction distances, whereby the shock absorber according to an example embodiment of the invention always releases only so much retraction distance as it is necessary for the complete absorption of the differently high obstacles.

The maximum damping strut resistance force is not reached at the damping strut resistance force course 70 over the curbstone edge, since the first time duration is set so that it does not expire when reaching the stroke excitation maximum. The maximal reached damping strut resistance force over the curbstone edge is therefore smaller than the resistance force reached over the low stone, whereby a particular comfort setting of the shock absorber over particular hard and fast impacts is reached. The functions provided for the extension movements of the shock absorber have analogous features.

Figure 7:
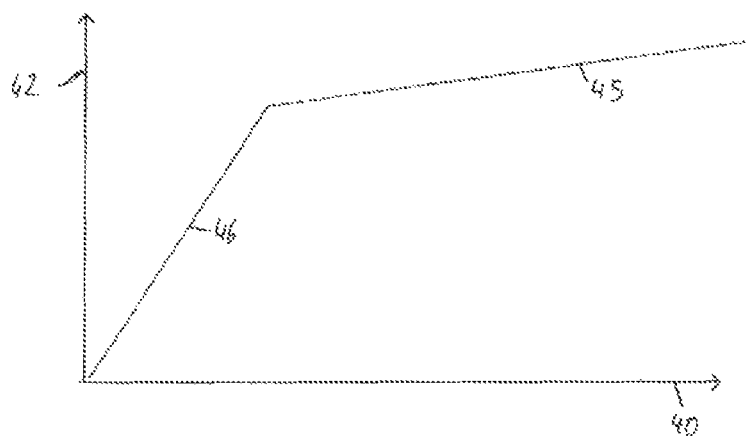
FIG. 7 shows characteristic curves of the damping strut resistance force over the retraction stroke according to an example embodiment of the invention.

In FIG. 7, the characteristic line of the damping strut resistance force 42 is plotted over the retraction stroke 40 of the damping strut 1, wherein first the damping strut 1 is retracted slowly by a long enduring stroke excitation (characteristic line 46), for example by a brake diving, and meanwhile impinges on an obstacle, for example on a curbstone edge, whereby it is retracted fast and long (characteristic line 45). The representation of the quantitative course of both characteristic line parts is linearised for simplification.

Figure 8:
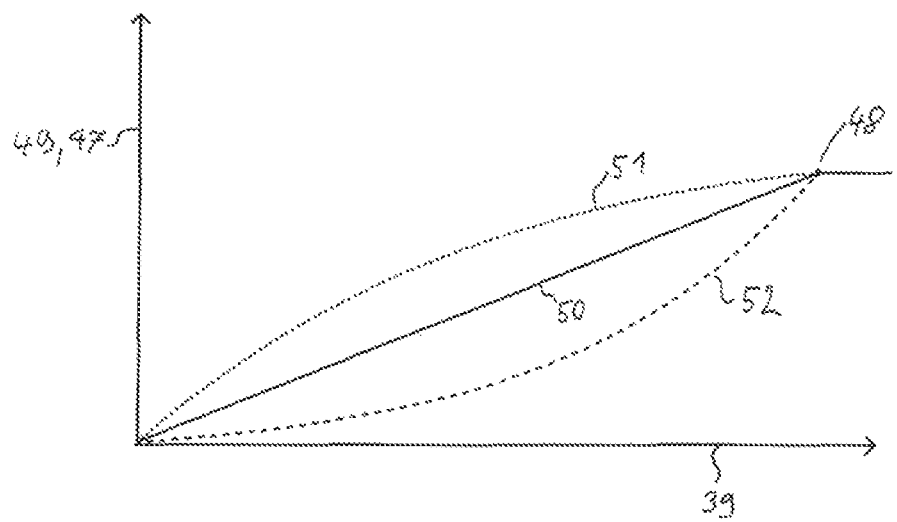
FIG. 8 shows a bias transmission from the bias regulator to the biasing means over the time according to an example embodiment of the invention.
Figure 9:
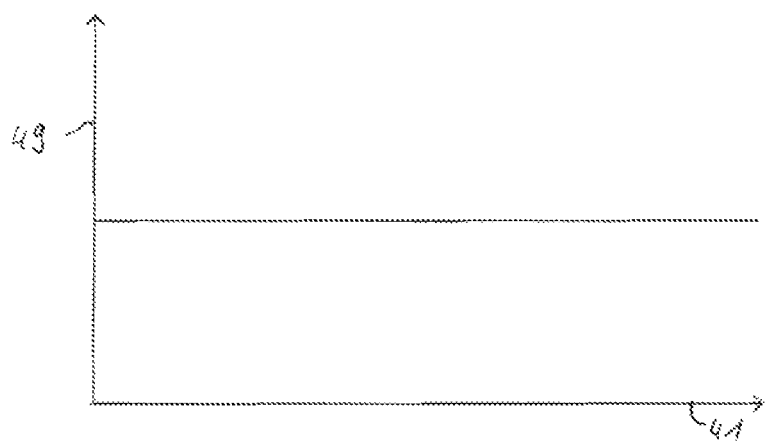
FIG. 9 shows a bias force on the valve disk that is independent from the retraction velocity according to an example embodiment of the invention.

In FIG. 8, the bias transmission of the bias regulator 27 to the biasing means 28 is plotted versus the time 39 and denoted with the reference sign 47, wherein the end of the first time duration is reached at the point that is denoted with the reference sign 48. The course of the bias transmission 47 can thereby be linear, progressive or degressive. At each point in time, the bias force 49 on the valve disk 30 is independent from the retraction velocity 41, as it is shown in FIG. 9.

Figure 10:
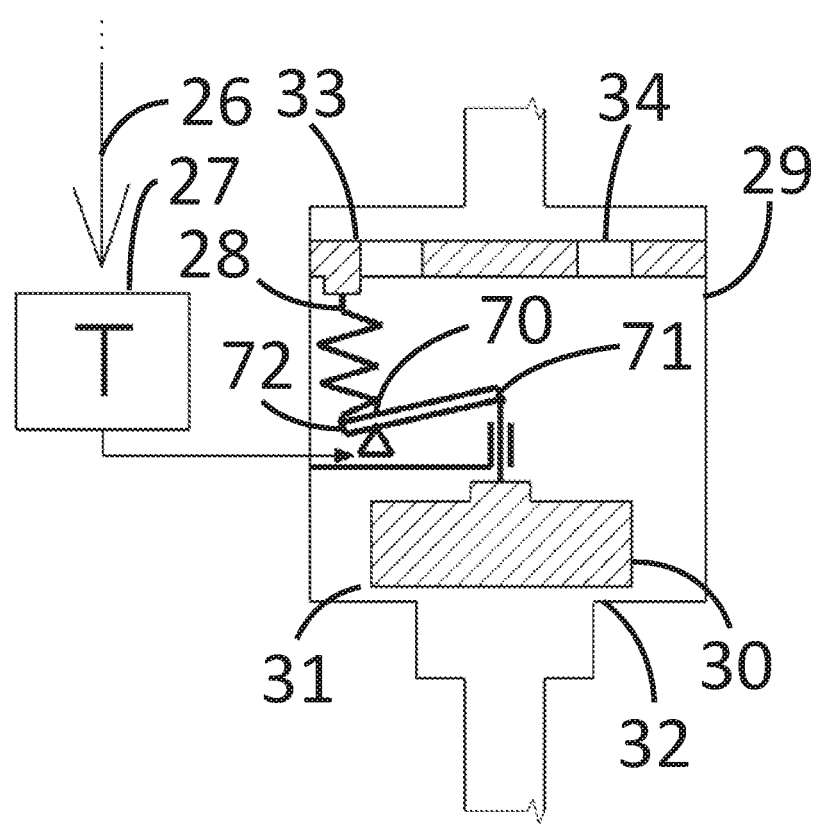
FIG. 10 shows a biasing means of the compression stage throttle with a lever acting on the biasing means according to an exemplary embodiment of the invention.
Figure 11:
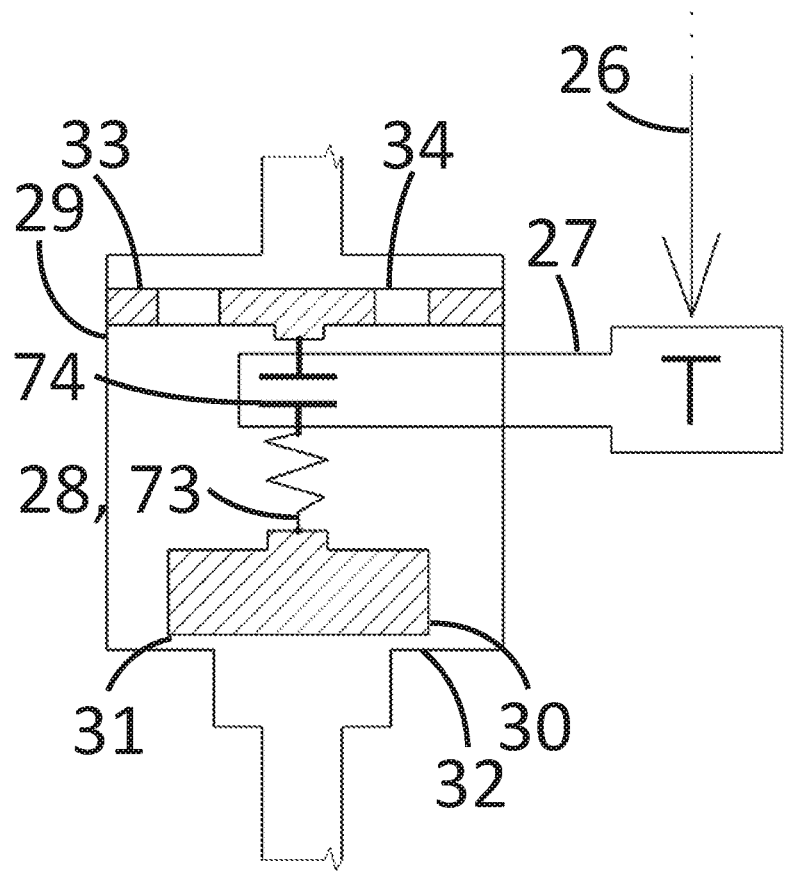
FIG. 11 shows a biasing means of the compression stage throttle implemented as a coil spring according to an exemplary embodiment of the invention.
Figure 12:
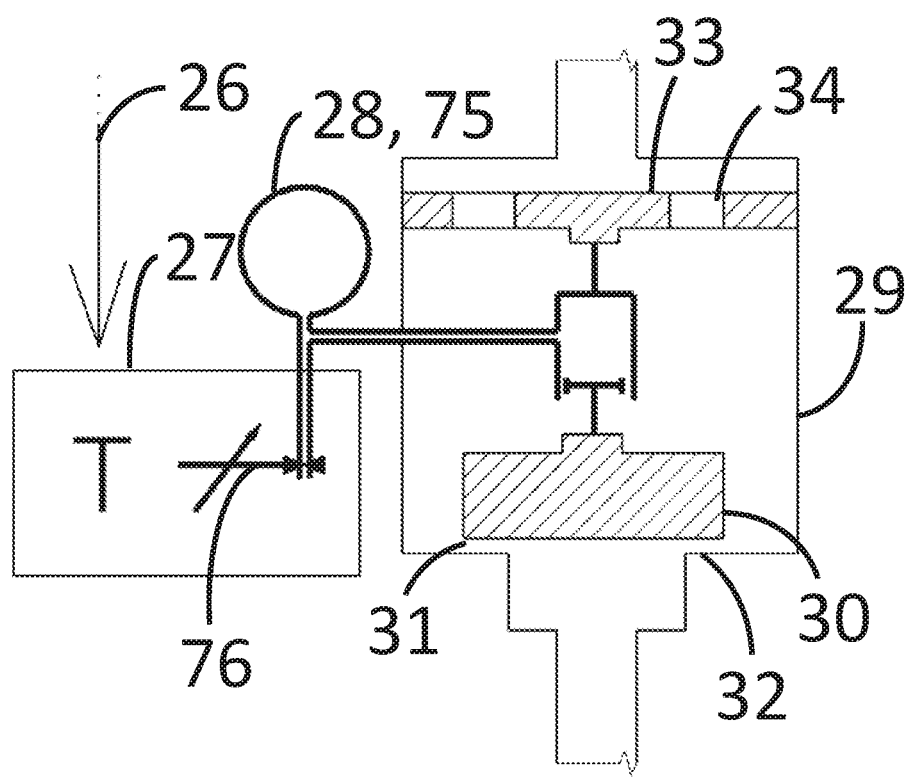
FIG. 12 shows a biasing means of the compression stage throttle implemented as a gas spring according to an exemplary embodiment of the invention; and, FIG. 13 shows a biasing means of the compression stage throttle implemented as a permanent magnet according to an exemplary embodiment of the invention.
Figure 13:
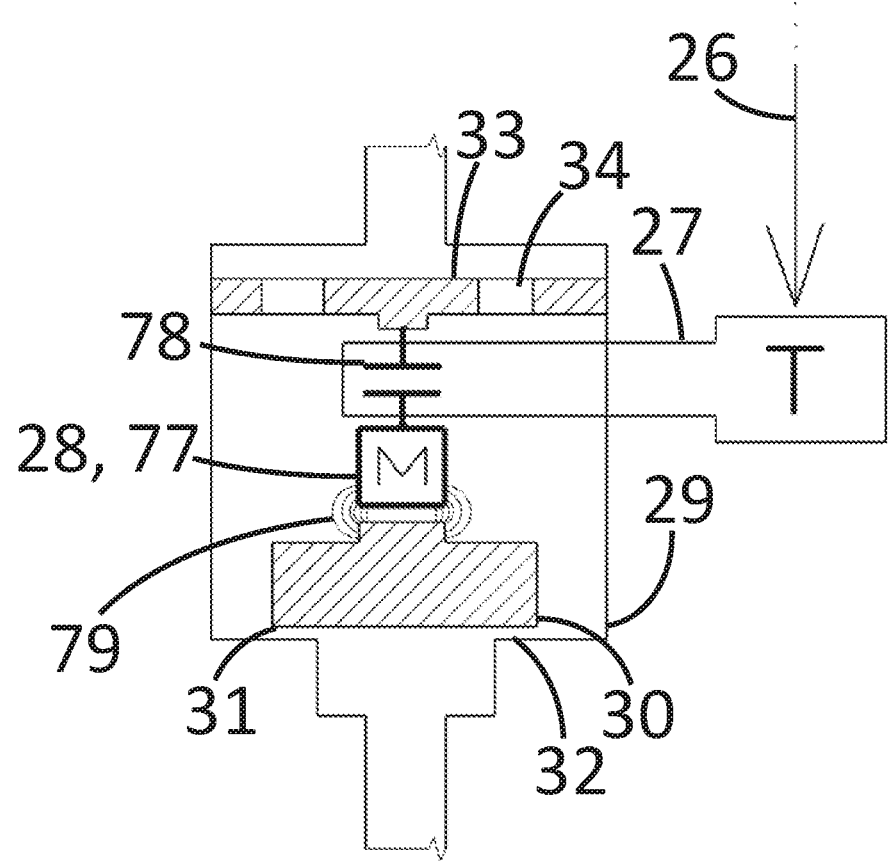

FIG. 10 shows biasing means 28 of the compression stage throttle 16 with a lever 70 acting on the biasing means 28. The lever 70 has a first lever arm 71 and a second lever arm 72. The first lever arm acting on valve disk 30 is longer than the second lever arm acting on biasing means 28. FIG. 11 shows biasing means 28 of the compression stage throttle 16. The biasing means 28 shown in FIG. 11 is a coil spring 73 and the bias regulator 27 is a clutch 74. FIG. 12 shows biasing means 28 of the compression stage throttle 16. The biasing means 28 shown in FIG. 12 is a gas spring 75 and the bias regulator 27 is a pressure reduction valve 76. FIG. 13 shows biasing means 28 of the compression stage throttle 16. The biasing means 28 shown in FIG. 13 is a permanent magnet 77 and the bias regulator 27 is a positioning device 78. A magnetic force generated by the magnetic field 79 acts on the valve disk 30 via which the permanent magnet 77 interacts with the valve disk 30 to generate the bias.

It is understood that the foregoing description is that of the preferred embodiments of the invention and that various changes and modifications may be made thereto without departing from the spirit and scope of the invention as defined in the appended claims.

LIST OF REFERENCE NUMERALS 1 damping strut
2 shock absorber
3 damping cylinder
4 damping cylinder head
5 wheel eye
6 damping cylinder floor
7 damping piston
8 damping piston rod
9 opening
10 frame eye
11 damping volume
12 counter volume
13 stop
14 rebound stage throttle
15 rebound stage valve
16 compression stage throttle
18 volume compensation device
19 compensation cylinder
20 compensation piston
21 buffer volume
22 compensation volume
23 retract diction device
24 frame distance sensor
25 wheel distance sensor
26 signal line
27 bias regulator
28 biasing means
29 control space
30 valve disk
31 valve disk opening
32 valve disk seat
33 support disk
34 passage
35 wheel
36 wheel hub
37 street 38 curbstone edge
39 time axis
40 retract stroke
41 retract velocity
42 damping strut resistance force
43 relative stroke
44 absolute stroke
45 characteristic curve at fast retract
46 characteristic curve at slow retract
47 bias transfer of the bias regulator
48 end of first time duration
49 bias force on the valve disk
50 linear time curve
51 progressive time curve
52 degressive time curve
53 excitation amplitude of the stroke excitation
54 stroke excitation of desired damping strut movements
55 stroke excitation of undesired damping strut movements
56 stroke excitation maximum
57 range of stroke maxima at obstacles
58 excitation duration of stroke excitation
59 stroke excitation by curbstone edge
60 stroke excitation by low stone
61 stroke excitation by braking process
62 stroke excitation by pedaling
63 damping strut resistance force course during stroke excitation 66 by curbstone edge
64 damping strut resistance force course during stroke excitation 67 low stone
65 damping strut resistance force course during stroke excitation 68 by braking process
66 damping strut resistance force course during stroke excitation 69 by pedaling
70 lever
71 first lever arm
72 second lever arm
73 coil spring
74 clutch
75 gas spring
76 pressure reduction valve
77 permanent magnet
78 positioning device
79 magnetic field

What is claimed is:

1. A damping strut comprising:
a hydraulic shock absorber having a damping volume filled with an incompressible damping fluid;
a retract detection device coupled with said hydraulic shock absorber and configured to detect a start and an end of a retraction of said hydraulic shock absorber;
a compression stage throttle having a disk valve with a valve disk;
said compression stage throttle being arranged so that damping fluid flows through said compression stage throttle in a direction opposite to a closing direction of the disk valve as the hydraulic shock absorber is retracted thereby generating a damping strut resistance force by said valve disk;
said compression stage throttle having a biasing means configured for biasing the valve disk against a through flow direction of the disk valve;
said biasing means having a force-distance-characteristic curve in at least one range of a valve stroke (x) of the valve disk, wherein a first derivative of said force-distance-characteristic curve is substantially zero ($F'=dF/dx \approx 0$) and has a bias value (K), and wherein a bias on the valve disk is independent from a current valve stroke at each point in time of the retraction of said hydraulic shock absorber;
said compression stage throttle having a bias regulator that couples said biasing means with said valve disk; and,
said bias regulator being interconnected with said retract detection device and configured to raise said bias value (K) during a first period of time beginning at a start value as the retraction of said hydraulic shock absorber starts.

2. The damping strut according to claim 1, wherein said bias regulator is interconnected with said retract detection device and configured to reset said bias value (K) to the start value as said retract detection device detects an end of the retraction.

3. The damping strut according to claim 1, further comprising:
an extend detection device coupled with said hydraulic shock absorber and configured to detect a start of an extension of said hydraulic shock absorber; and,
said extend detection device being interconnected with said bias regulator and configured to lower said bias value (K) to the start value during a second period of time as the extension of said hydraulic shock absorber starts.

4. The damping strut according to claim 1, further comprising:
a rebound stage throttle connected in parallel to said compression stage throttle and to said disk valve; and,
said rebound stage throttle being arranged to be flowed through by the damping fluid during the extension of said hydraulic shock absorber so that during the extension of said hydraulic shock absorber the valve disk is pressed on a valve disk seat of the valve disk.

5. The damping strut according to claim 1, wherein the biasing means is elastic to allow the bias on the valve disk to be generated, wherein said biasing means is directly coupled with the valve disk via said bias regulator, and wherein the at least one range of the valve stroke (x) of the valve disk is so much smaller than the stroke of the biasing means that the force-distance-characteristic curve has a constant bias value in the at least one range of the valve stroke (x).

6. The damping strut according to claim 1, wherein the biasing means is elastic to allow the bias on the valve disk to be generated, and wherein said biasing means is indirectly coupled with the valve disk via said bias regulator by a gear with which the valve stroke of the valve disk and the stroke of the biasing means are arranged in a gear ratio with respect to each other so that the force-distance-characteristic curve has a constant bias value in the at least one range of the valve stroke (x).

7. The damping strut according to claim 6, wherein the gear is a lever, and wherein a first lever arm of the lever acting on the valve disk is longer than a second lever arm acting on the biasing means.

8. The damping strut according to claim 1, wherein the biasing means is a coil spring and the bias regulator is a clutch, wherein a spring force of the coil spring is controlled by the clutch, and wherein the coil spring interacts with the valve disk via the clutch to generate the bias.

9. The damping strut according to claim 5, wherein the biasing means is a gas spring, wherein the bias regulator is a pressure reduction valve, wherein the spring force of the gas spring is controlled by the pressure reduction valve, and wherein the gas spring interacts with the valve disk via the pressure reduction valve to generate the bias.

10. The damping strut according to claim 1, wherein the biasing means is an electromagnet and the bias regulator is an electric current control circuit, wherein a strength of the magnetic field generated by the electromagnet is controlled by the electric current control circuit, and wherein the electromagnet interacts with the valve disk to generate the bias.

11. The damping strut according to claim 1, wherein the biasing means is a permanent magnet and the bias regulator is a positioning device, wherein the permanent magnet is positioned at variable distances relative to the valve disk, and wherein the magnetic force that acts on the valve disk and via which the permanent magnet interacts with the valve disk is controlled to generate the bias.

12. The damping strut according to claim 1, wherein the at least one range of the valve stroke (x) is a complete valve stroke of the valve disk.

13. The damping strut according to claim 1, wherein the start value is zero.

14. The damping strut according to claim 1, wherein said biasing means and the valve disk are coupled via said bias regulator such that a force necessary for biasing said biasing means is generated by a pressure difference of the damping fluid on the disk valve.

15. The damping strut according to claim 14, wherein a physical work necessary for biasing the biasing means is performed by a small amount of damping fluid that is flown out of the damping volume and that did not yet pass the valve disk seat.

16. A method for operating a damping strut according to claim 1, the method comprising the steps of:
starting a movement of the hydraulic shock absorber;
beginning with the starting of the movement of the shock absorber, exclusively raising the bias value (K) of the valve disk by said bias regulator during the first period of time, wherein said raising of the bias value (K) begins at the start value.

17. The according to claim 16, further comprising the step of:
holding the bias value (K) of the valve disk at a maximum value after the first period of time has elapsed.

18. The method according to claim 16, further comprising the steps of:
reversing a direction of the movement of the hydraulic shock absorber; and,
lowering the bias of the valve disk to the start value during the second period of time as the reversing of the direction of the movement of the hydraulic shock absorber starts.

19. The method according to claim 6, wherein the first period of time is between 0.01 and 0.8 seconds.

20. The method according to claim 18, wherein a period during which the bias of the valve disk is lowered to the start value is shorter than the first period of time.

21. The method according to claim 16, further comprising the step of:
raising the bias value (K) of the valve disk from the start value to a constant bias value during the first period of time; and,
wherein the raising of the bias value of the valve disk from the start value to the constant bias value during the first period of time duration occurs linearly, degressively or progressively.

22. The method according to claim 21, further comprising the step of:
choosing the constant bias value of the bias of the valve disk so that the damping strut resistance force generated by the valve disk is so high after the first period of time has elapsed that the hydraulic shock absorber does not retract and is therefore rigid during an occurrence of a maximal admissible retraction velocity of the hydraulic shock absorber.

23. The method according to claim 18, wherein the first period of time is between 0.05 and 0.5 seconds, and
wherein a period during which the bias of the valve disk is lowered to the start value is half as long as the first period of time.

24. A damping strut comprising:
a hydraulic shock absorber having a damping volume filled with an incompressible damping fluid;
an extend detection device coupled with said hydraulic shock absorber and configured to detect a start and an end of an extension of said hydraulic shock absorber;
a rebound stage throttle having a disk valve with a valve disk,
said rebound stage throttle being arranged so that the damping fluid flows through said rebound stage throttle in a direction opposite to the closing direction of the disk valve as the hydraulic shock absorber is extended thereby generating a damping strut resistance force by said valve disk;
said rebound stage throttle having a biasing means configured for biasing the valve disk against a through flow direction of the disk valve;
said biasing means having a force-distance-characteristic curve in at least one range of a valve stroke (x) of the valve disk, wherein a first derivative of the force-distance-characteristic curve is substantially zero ($F'=dF/dx\approx 0$) and has a bias value (K),
said rebound stage throttle having a bias regulator that couples said biasing means with said valve disk; and,
said bias regulator being interconnected with said extend detection device and configured to raise said bias value (K) during a first period of time beginning at a start value as the extension of the hydraulic shock absorber starts.

25. The damping strut according to claim 24, wherein said bias regulator is interconnected with said extend detection device and configured to reset said bias value (K) to the start value as said extend detection device detects an end of the extension.

26. The damping strut according to claim 24, further comprising:
a retract detection device coupled with said hydraulic shock absorber and configured to detect a start of the retraction of said hydraulic shock absorber; and,
said retract detection device being interconnected with said bias regulator and configured to lower the bias value (K) during a second period of time as the retraction of said hydraulic shock absorber starts.

27. The damping strut according to claim 24, further comprising:
a compression stage throttle connected in parallel to said rebound stage throttle and to said disk valve; and,
said compression stage throttle being arranged to be flowed through by the damping fluid during the extension of said hydraulic shock absorber so that the valve disk is pressed on a valve disk seat of said disk valve during the retraction of said hydraulic shock absorber.

* * * * *